J. WRIGHT.
PUNCHING MACHINE.
APPLICATION FILED JUNE 10, 1914.

1,153,410.

Patented Sept. 14, 1915.
6 SHEETS—SHEET 1.

FIG. I.

Witnesses
Wynne Johnson

Inventor
John Wright
By
C. L. Parker
Attorneys

J. WRIGHT.
PUNCHING MACHINE.
APPLICATION FILED JUNE 10, 1914.

1,153,410.

Patented Sept. 14, 1915.
6 SHEETS—SHEET 3.

Witnesses
Wynne Johnson

Inventor
John Wright
By C. L. Parker
Attorneys

J. WRIGHT.
PUNCHING MACHINE.
APPLICATION FILED JUNE 10, 1914.
1,153,410.
Patented Sept. 14, 1915.
6 SHEETS—SHEET 5.
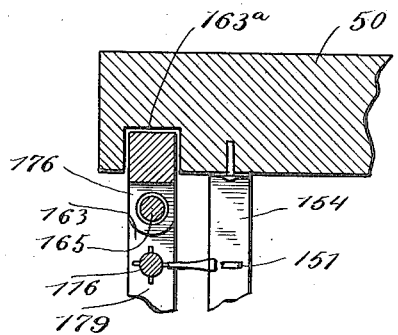
FIG. 5.
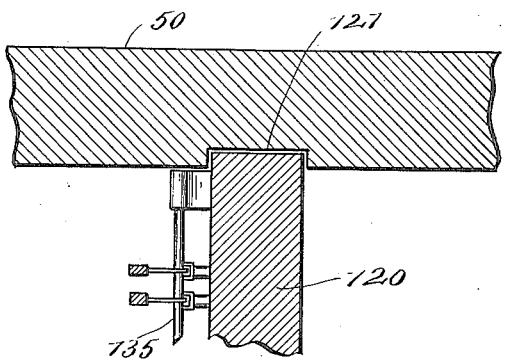
FIG. 6.
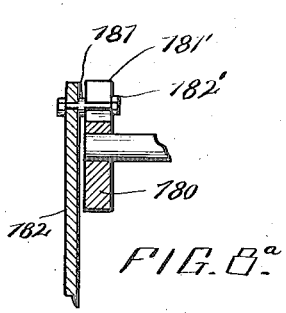
FIG. 7.
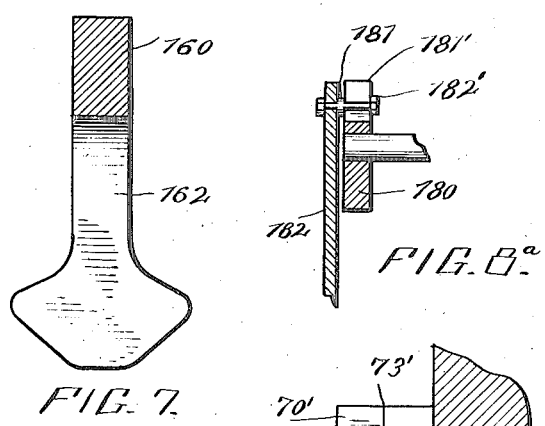
FIG. 8ª.
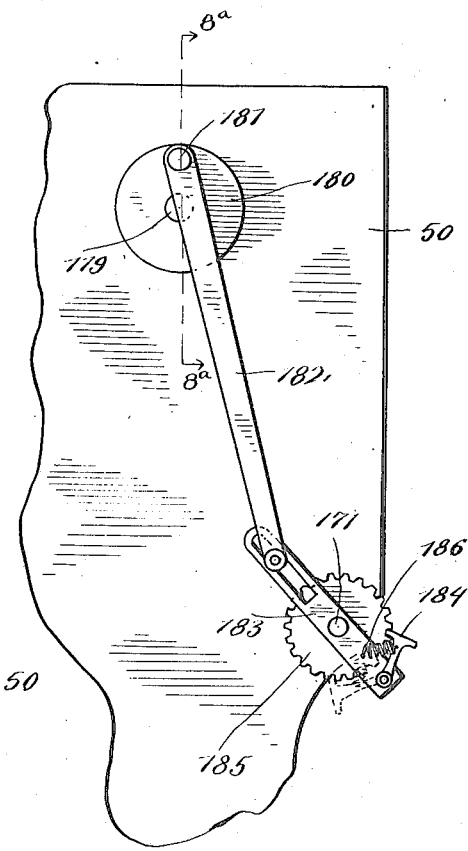
FIG. 8.
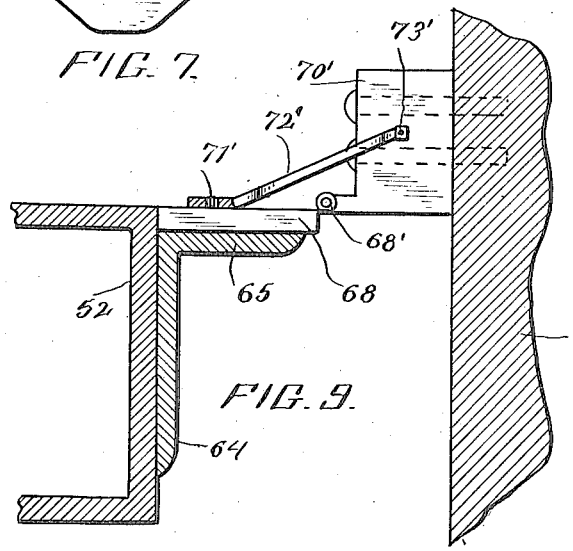
FIG. 9.
Witnesses
Wynne Johnson
Inventor
John Wright
By
C. L. Parker.
Attorneys

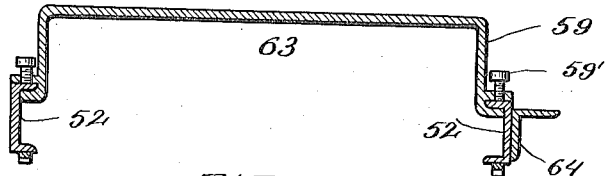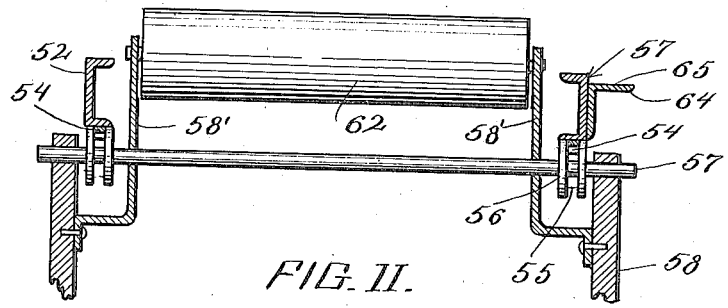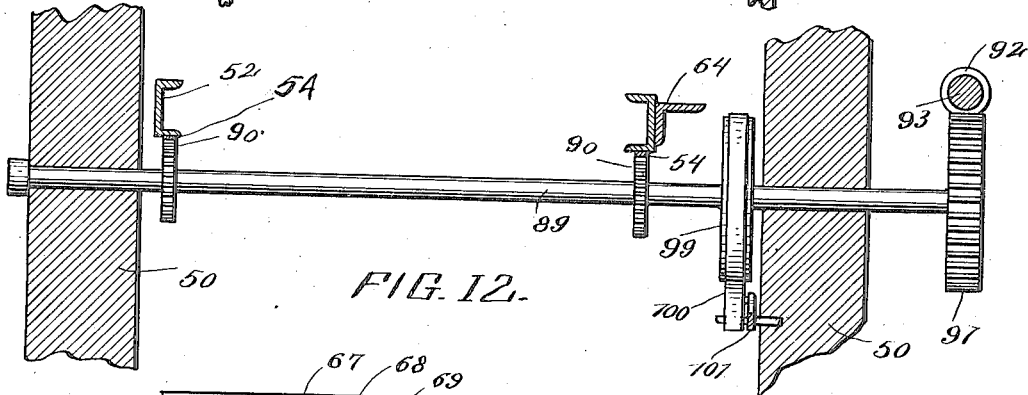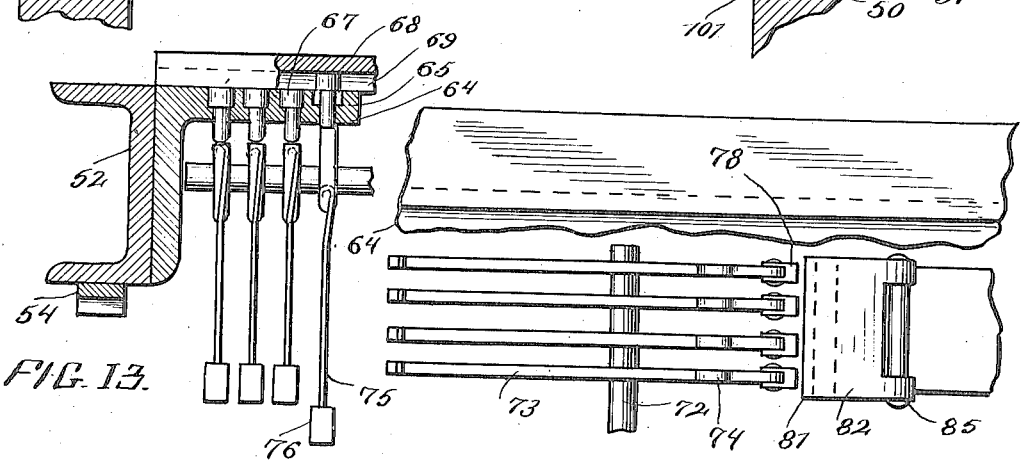

UNITED STATES PATENT OFFICE.

JOHN WRIGHT, OF WILMINGTON, DELAWARE.

PUNCHING-MACHINE.

1,153,410.  Specification of Letters Patent.  Patented Sept. 14, 1915.

Application filed June 10, 1914. Serial No. 844,189.

*To all whom it may concern:*

Be it known that I, JOHN WRIGHT, a subject of the King of Great Britain, residing at Wilmington, in the county of New Castle and State of Delaware, have invented certain new and useful Improvements in Punching-Machines, of which the following is a specification.

My invention relates to improvements in machines for punching sheet or plate metal.

An important object of the invention is to provide a machine of the above mentioned character, which will automatically punch sheet or plate metal, in an expeditious manner, and which is capable of adjustment within wide limits, whereby the arrangement and spacing of the punched openings may be varied, to meet the requirements of the particular work.

A further object of the invention is to provide a punching machine, embodying a longitudinally movable carriage for holding and moving the sheet metal, and punching mechanism to punch the holes in the sheet metal during the travel of the carriage in opposite directions.

A further object of the invention is to provide simple and reliable means, which are capable of adjustment, for effecting a step by step movement of the carriage in one or both directions.

A further object of the invention is to provide efficient gag control mechanism, for rendering the punching elements active and inactive, such mechanism being capable of adjustment, in accordance with the openings to be punched.

A further object of the invention is to provide a machine of the above mentioned character, which is comparatively simple in construction, will operate expeditiously whereby a substantial saving is effected in both time and money, and which is wholly automatic in operation, whereby the entire sheet or plate may be punched without the mediation of the operator.

Other objects and advantages of the invention will be apparent during the course of the following description.

Figure 1:
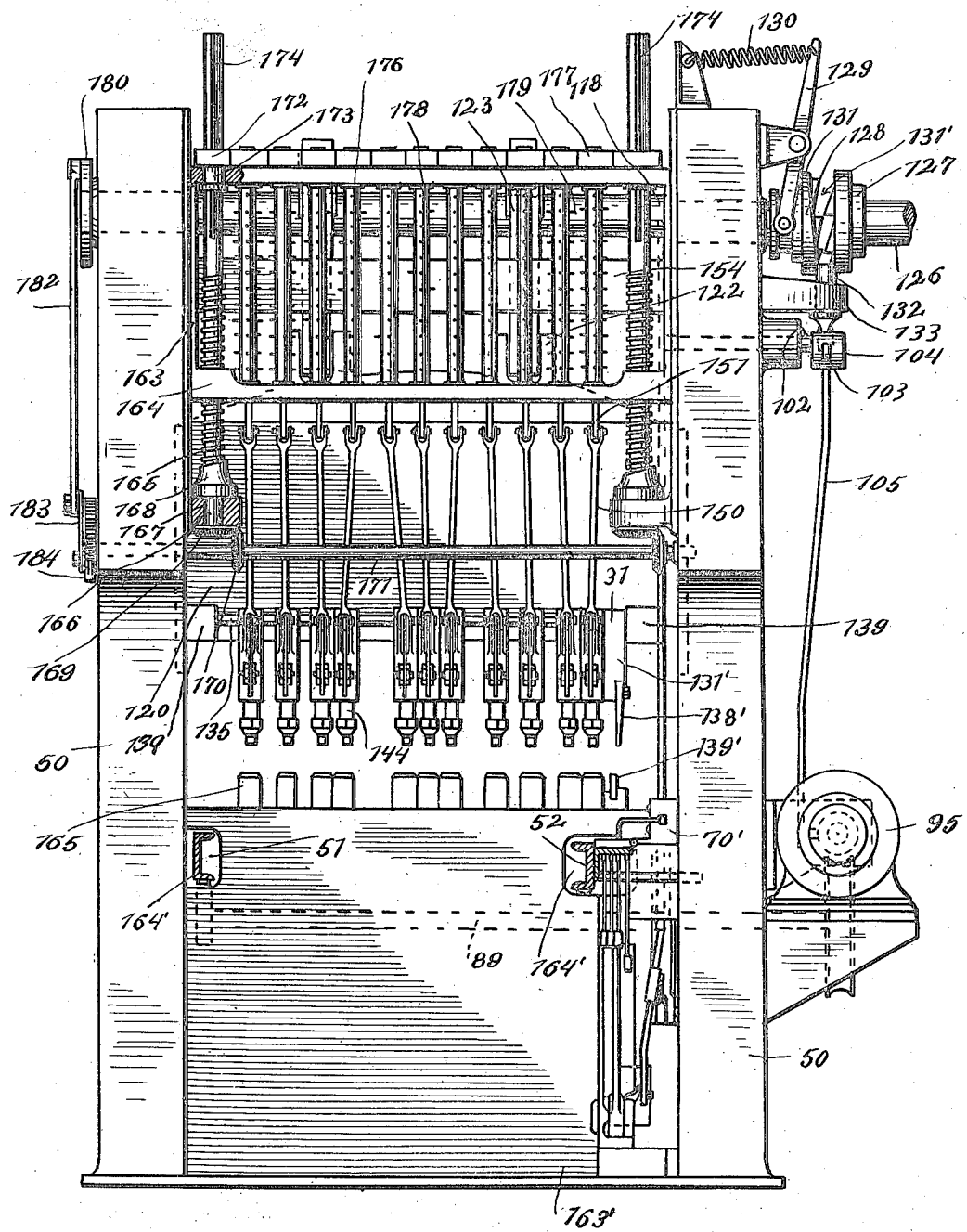
Figure 2:
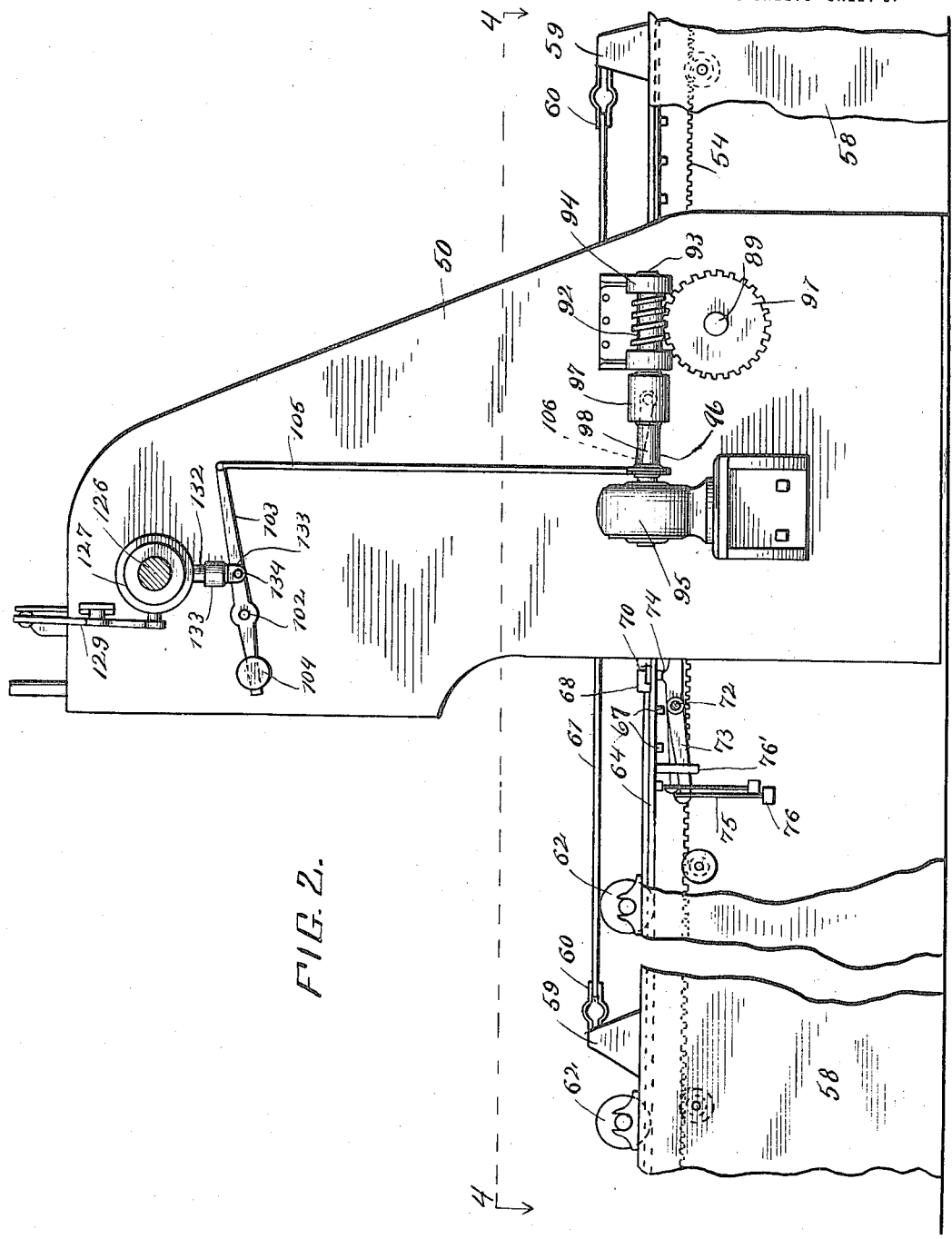
Figure 3:
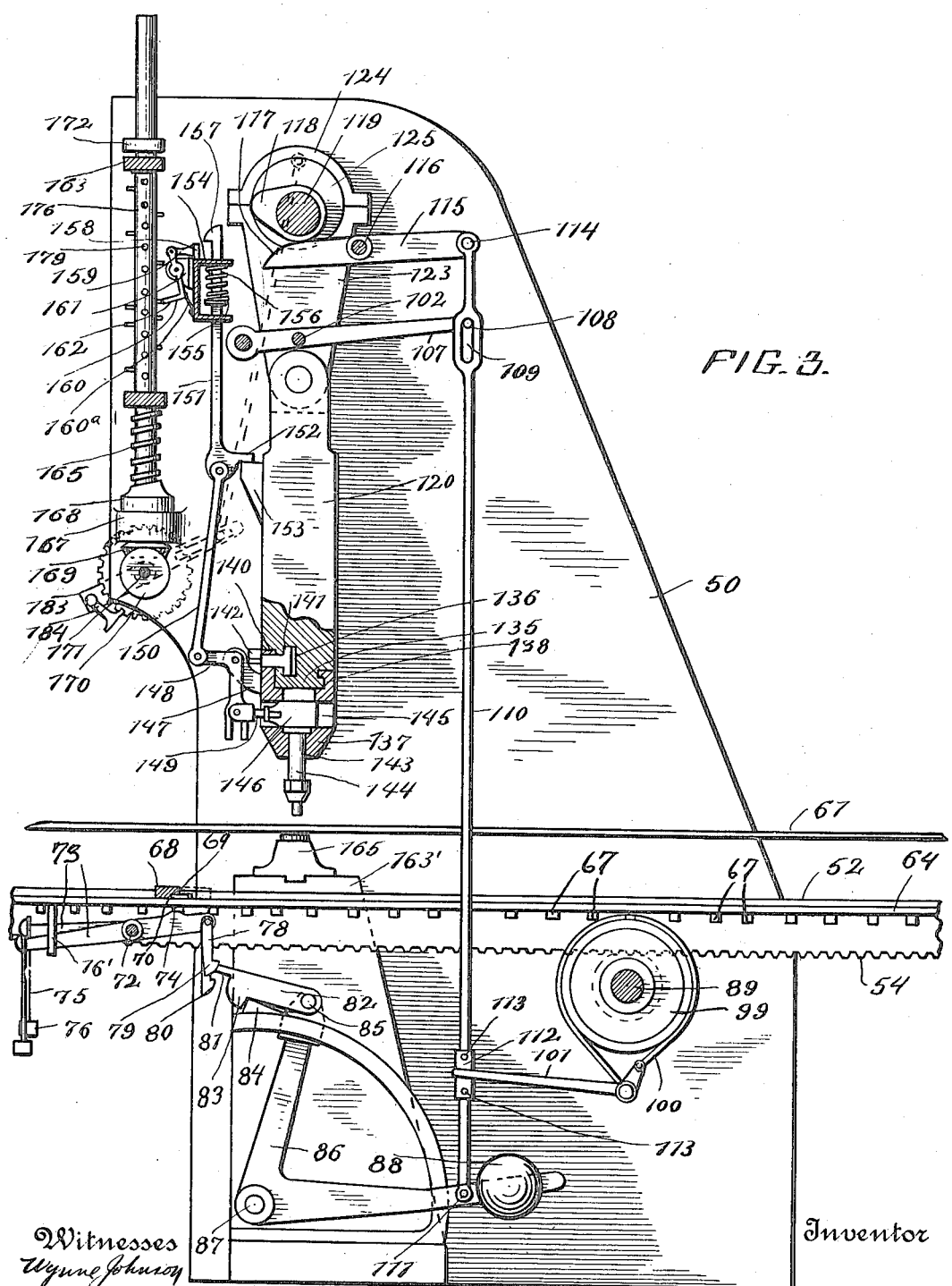
Figure 4:
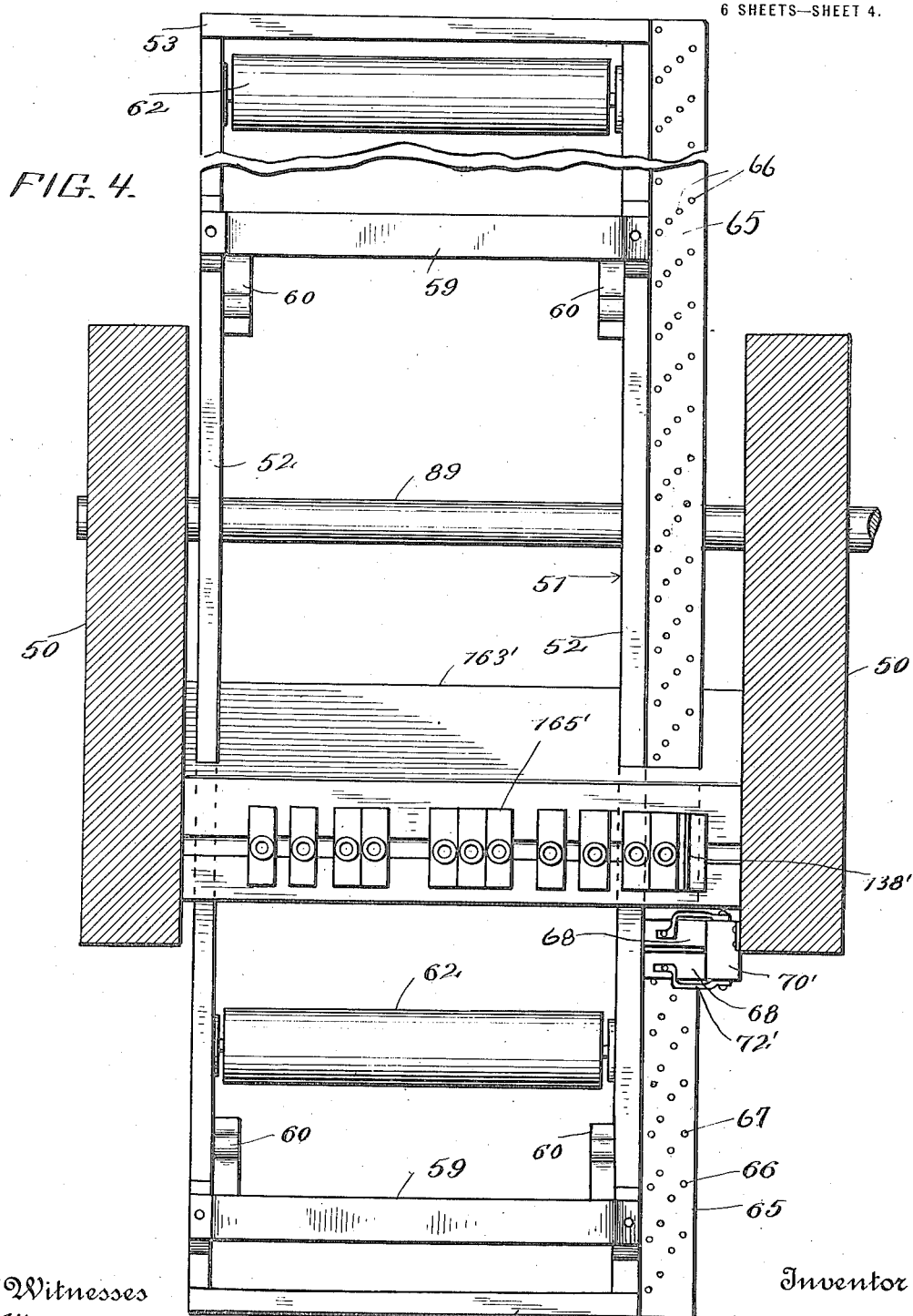

In the accompanying drawings forming a part of this specification and in which like numerals are employed to designate like parts throughout the same, Figure 1 is a front end elevation of the machine embodying my invention, Fig. 2 is a side elevation of the same, parts being shown in section and broken away for the sake of illustration, Fig. 3 is a similar view, with the adjacent side member or casting removed, parts being shown in section and parts broken away, Fig. 4 is a horizontal sectional view taken on line 4—4 of Fig. 2, Fig. 5 is a detail section through a portion of the vertically movable frame included in the gag control mechanism, showing the manner in which the same operates in slidable engagement with the side member or casting, Fig. 6 is a similar view of the vertically movable slide which carries the punching elements, Fig. 7 is a plan view of trip finger or element included in the gag control mechanism, Fig. 8 is a side elevation of the driving means for the gag control mechanism, Fig. 8$^a$ is a detail section taken on line 8$^a$—8$^a$ of Fig. 8, Fig. 9 is a side elevation of the presser-bar, showing the lock lever in the lower holding position, partly in section for the purpose of illustration, Fig. 10 is a transverse sectional view through the longitudinally movable carriage and a stool, showing the manner in which the stool is mounted upon the carriage, Fig. 11 is a similar view showing the sheet metal supporting roll, and the supports or brackets therefor, Fig. 12 is a side elevation of the driving shaft for the carriage, and associated elements, the carriage being shown in transverse section, Fig. 13 is a front end elevation, partly in section, of the mechanism for causing the carriage to partake of a step by step movement, and, Fig. 14 is a plan view of the same.

In the drawings, wherein for the purpose of illustration is shown a preferred embodiment of my invention, the numeral 50 designates upstanding or vertical side members or castings constituting a supporting structure, between which is arranged to reciprocate a horizontal carriage designated as a whole (see Fig. 1), by the numeral 51. This carriage comprises longitudinal beams 52 rigidly connected at their ends by transverse bars 53. Secured to the lower sides of the longitudinal beams 52 (see Fig. 11) are rack-bars 54, operating within annular grooves 55 of supporting wheels 56, the flanges of which engage the lower sides of the beams 52. The supporting wheels 56 are rotatably mounted upon shafts 57 carried by supports 58, but incapable of moving longitudinally thereof. It is thus seen that the wheels 56 not only serve to support the carriage during its longitudinal travel but prevent the same from moving laterally.

Slidably mounted upon the opposite ends of the carriage 51 to move longitudinally thereof are stools 59 having bolts 59' (see Fig. 10), whereby they may be clamped to the carriage at desired positions. These stools carry near their ends clamps 60 of any well known or preferred type, arranged to receive the corners of the sheet of metal 61 to be punched. I preferably employ a suitable number of rolls 62, secured to the supports 58 by brackets 58' and arranged below the section of sheet metal, preventing the same from sagging, as clearly shown in Fig. 11. Any suitable number of these rolls being used. The brackets extend into the open carriage 51 and do not interfere with the longitudinal travel of the same. The stools 59 are formed open, as shown in Fig. 10, providing spaces 63 for the passage of brackets 58' carrying the rolls 62, whereby these rolls will not interfere with the longitudinal adjustment of the stools upon the carriage.

Means are provided to accurately move the carriage longitudinally step by step, the length of each step being capable of adjustment. Such means comprises (see Figs. 1, 2, 13 and 14), a horizontal plate or member 64, which is preferably L-shaped in cross-section. The vertical portion of this member is rigidly secured to one beam 52 by any suitable means. The horizontal portion or plate 65 of the member 64 is provided with a plurality of rows of spaced openings 66, as clearly shown in Fig. 4. The openings in each longitudinal row are equidistantly spaced, while the openings in the transverse rows formed by the same are laterally equidistantly spaced forming diagonal rows, as shown. It is obvious that the spacing of the openings in the longitudinal rows may be increased or decreased by increasing or decreasing the number of longitudinal rows. Arranged within the openings 66 (see Fig. 13) are headed vertical movable pins 67, which when in their normal lower position extend downwardly beyond the plate 65 for a substantial distance, as shown. The upper headed ends of these pins are normally flush with the upper surface of the plate 65.

Arranged above the perforate plate 65 are vertically swinging presser-bars 68 (see Figs. 4 and 9), which are hinged at 68', to a fixed bracket 70', rigidly secured to the support 58. Each presser-bar 68 carries an upstanding lug or trunnion 71' to be removably mounted within the outer apertured end of a vertically swinging lock lever 72', pivoted at 73'. In Fig. 4, for the sake of illustration, I have shown both of the presser-bars 68 in the lower horizontal position, to extend transversely of the plate 65, but only one of the presser-bars 68 occupies such position at a time, depending upon the direction of travel of the carriage, the other presser-bar being moved out of the way to a vertical position. The lever 72' will lock the corresponding presser-bar in the horizontal position. The presser-bars, as shown in Fig. 3, are provided upon their lower sides with openings or recesses 69, which are oppositely faced, forming shoulders 70, for a purpose to be more fully explained.

Arranged below and in proximity to the presser-bar 68 is a stationary horizontal stub-shaft 72, which is rigidly secured to the adjacent support 50 and upon which are independently pivotally mounted vertically swinging levers 73, as shown. Each lever 73 (see Fig. 3) is provided near the rear end with a substantially V-shaped portion or cam 74, adapted to successively engage with each pin in the contiguous longitudinal row, in a manner to be more fully explained. The forward end of each lever 73 has connection with a link 75 or the like carrying a weight 76 to move the cam 74 upwardly, a U-shaped bracket 76' being employed to limit such swinging movement of each lever 73. It is to be understood that instead of employing the weight I may use a spring for the same purpose. Pivotally connected with the rear end of each lever 73 is a depending lifting pawl 78, having a head 79 provided with a curved face 80. The head 79 is adapted for detachable engagement with a lip or extension 81 formed upon a holding pawl 82, to elevate the same upon its upward movement. The pawl 82 is provided with a head 83, adapted when the pawl is in the lower position to engage with a stop 84, whereby the longitudinal movement of the pawl in one direction is positively prevented. Pivotally connected with the rear end of the pawl 82 as shown at 85 is a bell-crank lever 86, pivoted at 87. A weight 88 is preferably adjustably mounted upon the horizontal arm of the bell-crank lever 86, as shown. Particular attention is called to the fact that the pawl 82 is formed sufficiently broad (see Fig. 14) whereby its lip 81 may be engaged and elevated by each of the depending pawls 78. At this point it is thought well to state that the means for effecting the longitudinal travel of the carriage, to be hereinafter described are stopped, when the bell-crank lever 86 swings downwardly.

Journaled through the rear portion of the side members or castings 50 is a horizontal transverse carriage operating shaft 89, (see Fig. 12) upon which are rigdly mounted pinions or gears 90, engaging the rack-bars 54, to effect the longitudinal travel of the carriage. The shaft 89 receives its rotation from a worm wheel 91, preferably arranged upon the outer side of the adjacent side member or casting 50, as shown in Fig. 3. The worm wheel 91 is engaged and driven by a worm 92, carried by a shaft 93 journaled through a stationary bearing 94, as shown. The numeral 95 designates a source of power such as a motor, having its armature shaft 96 connected and disconnected with and from the worm shaft 93 by clutch mechanism 97. This clutch mechanism, which may be of any well known or preferred type, is operated by a vertically swinging lever 98, whereby when the lever is swung down from its upper normal position the shafts 96 and 93 will be disconnected, the lever being shown in Fig. 2 in its normal upper position whereby the shafts 96 and 93 are connected. The lever 98 will be operated by means to be described. Rigidly mounted upon the shaft 89 preferably inwardly of the adjacent member or casting 50 is a brake wheel 99 (see Figs. 3 and 12), surrounded by a brake band 100, connected with and operated by a vertically swinging lever 101. When this vertically swinging lever is in the upper normal position the brake band is loose upon the brake wheel 99 allowing it to turn, when the lever 101 swings downwardly, the brake band clamps the brake wheel whereby the rotation of the shaft 89 is suddenly arrested.

Journaled through the upper portion of one of the members or castings 50 is a rock-shaft 102 (see more particularly Figs. 1 and 2), upon the outer end of which is rigidly mounted a vertically swinging lever 103, having a weight 104, preferably adjustably mounted upon one end thereof. Pivotally connected with the opposite end of the lever 103 is a depending rod or link 105, the lower end of which is pivotally connected with lever 98 as shown at 106. It is thus seen that when the rear end of lever 103 moves downwardly, lever 98 will be moved in the same direction, whereby shaft 93 will be stopped. Rigidly connected to the inner end of the rock-shaft 102 is a vertically swinging lever 107 (see Fig. 3) arranged inwardly of and adjacent the member or casting 50. The function of the lever 107 is to swing the lever 103 downwardly but it does not swing this lever upwardly. Secured to the rear end of the lever 107 is a laterally extending pin 108, operating within an elongated slot 109 formed through a rod 110, as shown. The lower end of the rod 110 is pivotally connected, as shown at 111, with the horizontal arm of the bell-crank lever 86. A sleeve 112 is rigidly secured to the rod 110 near and spaced from the pivot 111 thereof and carries spaced laterally extending pins or trunnions 113, receiving the outer end of the lever 101 therebetween to move the same upon the longitudinal movement of the rod 110, as is obvious. Pivotally connected with the upper end of the rod 110 as shown at 114, is a resetting lever 115 pivoted upon a stationary shaft 116, secured to the adjacent casting 50. The forward end of the lever 115 has a cam face 117, for engagement with a cam 118, rigidly mounted upon a transverse throw shaft 119, journaled through the upper ends of the castings 50.

From the foregoing description, it will be seen that when the lever 98 is arranged in the upper position, as indicated in Fig. 3, and the motor 95 is running, the worm 92 will rotate worm wheel 91 at properly reduced speed, whereby pinions 90 are rotated in engagement with the rack-bar 54, effecting a longitudinal movement of the carriage 51. The pin 67 in any of the longitudinal rolls which is farthest to the right will engage with the cam 74 of the correspondingly arranged lever 73, at about the time that the pin travels under the presser-bar 68. When this takes place the pin by traveling in engagement with the cam 74, moves the right end of the lever 73 downwardly, whereby the lip of the head 79 engages under the lip 81 of the pawl 82. Upon the further movement of the carriage, the pin 67 passes off of the shoulder 70, allowing the weight 76 to swing the right end of the lever upwardly, said pin entering the recess 69. The pawl 78 is thus elevated, whereby pawl 82 is raised and its head 83 moved out of engagement with the stop 84. The weight 88 now swings the bell-crank lever 86 to the right, whereby rod 110 swings lever 107 downwardly, which through the medium of rock-shaft 102 swings lever 103 downwardly. This downward movement of the lever 103 moves rod 105 downwardly, swinging lever 98 downwardly, to operate the clutch 97 and stop the rotation of the shaft 93, whereby the longitudinal travel of the table is stopped. The punching mechanism is thrown into action at this time, as will be described. Upon the further rotation of the throw shaft 119, which operates the punching mechanism to be described, the cam 118 engages the cam face 117 of lever 115, whereby the right end of the lever 115 is elevated, which raises the rod 110, swinging bell-crank lever 86 to the left, whereby the head 83 of pawl 82 will again engage stop 84, and the lever 86 be locked in its upper or set position. The upward movement of the rod 110 does not effect a corresponding movement of the lever 107, but it frees this lever so that it may move up at the proper time. This movement occurs when a clutch mechanism, to be described, assumes a certain position, whereby the weight 104 will swing the right end of the lever 103 upwardly and through the medium of rod 105 swings the lever 98 upwardly whereby the clutch 97 is again set.

The punching mechanism comprises a vertically movable slide or carriage 120, arranged between the castings 50, with the ends thereof or extensions carried thereby operating within vertical grooves 121, as shown in Fig. 6. This slide is continuously reciprocated during the operation of the machine and is provided at its upper end with pairs of knuckles 122 (see Fig. 1) receiving and having pivotal connection with pitmans 123, carrying at their upper ends cam straps 124, receiving cams 125, rigidly mounted upon the throw shaft 119.

The numeral 126 (see Fig. 1) designates a driving shaft, carrying a toothed clutch element 127, rigidly secured thereto, to engage and disengage a toothed coacting clutch element 128 which is splined upon the outer end of the throw shaft 119, as shown. The clutch element 128 is moved longitudinally or shifted in one direction, that is toward the clutch element 127, by a pivoted shifting lever 129, automatically moved by a spring 130, as shown. The clutch element 128 is provided with a cam face 131, providing an opening 131' between the elements 127 and 128 exteriorly of the tooth thereof, for receiving a lock-bolt 132, in the largest portion of the opening, that is the bolt 132 moves into the opening 131' upon the rotation of the elements 127 and 128 while they are locked together, when the largest portion of the opening moves into proximity to the bolt 132. Bolt 132 is mounted to vertically reciprocate within a stationary guide bracket 133 and is pivotally connected, at 134, with the lever 103. It is thus seen that the weight 104 will continuously hold the bolt 132 in slidable engagement with portions of the clutch element 127 and 128, automatically moving the same into the opening 131' therebetween, when the largest portion of the opening moves into proximity to the bolt 132. When this takes place, as above stated, the weight 104 descends, whereby the right end of the lever 103 rises, moving the lock-bolt 132 between portions of clutch elements 127 and 128, disengaging them to approximately simultaneously stop the rotation of shaft 119 and start the rotation of shaft 93. The bolt 132 enters the largest portion of the opening 131' between elements 127 and 128 when the slide 120 has traveled upwardly for about one-half of its stroke and completely disengages clutch elements 127 and 128 when the slide has moved to the end of its upward travel.

The lower end of the slide 120, as more clearly shown in Fig. 3, is provided with a T-head 135 and a T-shaped opening 136. The numeral 137 designates punch-holders having their upper ends pivoted with openings 138 properly shaped to receive the heads 135. In placing the punch-holders upon the head 135 they are first passed through either of openings 139 (see Fig. 1), at the ends of the slide, and then moved longitudinally upon the head 135, to the desired position. In this manner the punch-holders may be moved toward or away from each other for punching laterally spaced holes, having different distances therebetween. Each tool-holder 137 has an upwardly extending portion 140, apertured for receiving a headed bolt 141, the head of which is adapted to slide within the opening 136. The outer end of this bolt is screw-threaded to receive a clamping nut 142, whereby the punch-holder may be locked to the slide in any desired position. While I have shown and described this form of means to adjustably connect the tool holders to the slide I wish it understood that any other suitable means may be employed.

Each tool-holder (see Fig. 3) is provided with a vertical opening 143, receiving a headed punch element 144. The punch-holder is provided with a transverse opening 145, for receiving a reciprocatory gag 146, adapted for movement into and out of the path of travel of the punch element 144. It is thus seen that when the gag is in the position shown in Fig. 3, it will hold the punch element 144 from movement with relation to the slide whereby the punch element upon descending will cut the hole in the sheet metal, but when this gag is moved to the left out of the path of travel of the punch element 144, such punch element will be idle upon the down stroke of the slide and consequently incapable of punching an opening in the sheet metal. Rigidly secured to each punch-holder 137 is a forwardly extending bracket 147, having a bell-crank lever 148 pivoted thereto, as shown. The lower end of this bell-crank lever is suitably pivotally connected with an arm 149, in turn secured to the gag 146. Pivotally connected with the outer end of the bell-crank lever 148 is an upstanding link 150, the upper end of which is pivoted to a vertically reciprocatory rod 151. The rod 151 is provided near its lower end with a rearwardly extending projection or shoulder 152, adapted to rest upon an extension 153 carried by the slide 120 and movable therewith. Each of the reciprocatory rods 151 operates through openings in a transverse stationary horizontal guide beam 154, which is rigidly secured to the castings 50, as shown. A ring 155 is rigidly secured to the rod 151 within the beam 154 and is engaged by a compressible coil spring 156, the upper end of which engages a portion of the beam 154, to force the rod 151 downwardly, whereby it will descend with the slide, when it is released, upon the downward movement of the slide. It might be stated at this point, that when the rod 151 is released and moved downwardly with the slide, the gag 146 will remain in the operative position rendering the punch element 144 operative. Each rod 151 is provided at its upper end with a forwardly extending hook-head 157, adapted to be engaged and disengaged by a reciprocatory stop 158, slidably mounted upon the upper side of the beam 154. This stop 158 is moved by an arm 159 rigidly secured thereto, having suitable pivotal connection at its outer end with a vertically swinging lever 160, pivotally connected with a bracket 161, rigidly secured to the beam 154. The lever 160 is swung forwardly by a spring 160ª. At its lower end (see Fig. 7), the lever 160 is provided with a forwardly extending trip finger 162 having its ends oppositely beveled to be operated by the pin or pins included in the gag control mechanism when rotating in either direction.

Arranged below the punching elements 144 (see Figs. 1 and 3) is a support or casting 163', placed between the castings 50 and having openings 164' formed therethrough, to receive the longitudinal beam 52 of the carriage 51, as shown. Adjustably mounted upon the upper end of the support 163' by any suitable means are dies 165', to be arranged to receive the punching elements, as is customary. The sheet metal travels above and in slidable engagement with these dies, as shown. Arranged adjacent the right end punch-holder 137 is a cutter-blade holder 137', secured to the slide in an identical manner to the punch-holder. At its lower end the holder 137' carries a cutter-blade 138', coöperating with cutter-blade 139', secured upon the bed 163', by any suitable means. The function of this construction is to cut straight one longitudinal edge of the plate.

The gag control mechanism includes a vertically reciprocatory preferably open frame 163, disposed in advance of the slide 120. The frame 163 (see Fig. 5) has its ends or extensions carried thereby operating within vertical grooves 163ª formed in the castings 50. The frame 163 is provided at its lower corner with enlargements or bearings 164 having screw-threaded openings formed therethrough, to receive vertical operating screws 165. At their lower ends these screws have smooth extensions 166, operating through fixed bearings 167. Arranged above the bearings are heads 168, rigidly secured to the operating screws, preventing the downward longitudinal movement of the same, while bevel-gears 169 are rigidly connected to the lower end of the smooth portions 166 for rotating the operating screws and preventing their upward movement. The bevel gears 169 are engaged and driven by bevel gears 170 rigidly mounted upon a transverse shaft 171, which is given a step by step turning movement by means to be described.

The numeral 172 designates outer or end pinions, carrying collars 173, journaled through openings in the upper portion of the frame 163. The upper portions of the operating screws 167 are smooth and are provided with longitudinal grooves 174, receiving splines carried by the pinions 172. It is thus seen that as the frame 163 is traveling upwardly or downwardly, the pinions 172 move upwardly and downwardly with it and are at the same time rotated by the operating screws 165.

The numeral 176 designates vertically rotatable shafts, the opposite ends of which are journaled through the upper and lower portions of the vertical movable frame 163. At their upper ends, the shafts 176 extend upwardly beyond the frame 163, and have pinions 177 rigidly connected therewith, which engage each other, and the outermost pinions 177 also engage the pinions 172 to be driven thereby. It is thus seen that the shafts 176 are all being rotated during the reciprocatory movement of the carriage 163. Each shaft has spirally arranged openings 178, which are preferably arranged at 90° apart. Within these openings are arranged pins 179, which may be held therein by any suitable means. It should be distinctly understood that these pins may be connected with the rotatable shafts 176 by any other suitable means. By this arrangement any suitable number of pins may be secured to each shaft, and these pins may be angularly arranged with relation to the shaft, in accordance with the work to be done. By referring to Fig. 3, it will be seen that upon the rotation of the corresponding shaft 176, the frame 163 being also raised a proper distance, when the pin 179 engages the trip cam 162, the lever 160 will have its lower end swung rearwardly, whereby stop 158 is moved out of the path of travel of the head 157 thus allowing the rod 151 to descend, whereby the punch element is rendered active, as above stated. However, if there is no pin in the opening, or connected with the shaft at that point, the stop 158 will be arranged beneath and in the path of travel of the head 157, whereby upon the downward movement of the slide 120, the rod 151 will be held against downward movement. When this occurs, link 150 being connected with the bell-crank lever 148, swings the lower end of the same forwardly, whereby the gag 146 is moved forwardly out of the path of travel of the punch element 144, such punch element being then rendered idle.

Rigidly connected (see Fig. 8), with one end of the throw shaft 119 is a disk crank 180 having a pin 181 preferably adjustably connected therewith to be moved toward or away from the periphery of the same. This connection may be effected by any suitable means, one example of which being the provision of a radially extending slot 181' to receive the bolt, such bolt being clamped therein at the desired position by a nut 182'. Pivotally connected with the disk 180 is a depending pitman 182, the lower end of which is adjustably pivotally connected with a vertically swinging lever 183. The lever 183 is pivotally or loosely mounted upon the shaft 171, at a point between the ends of the lever. A double acting pawl 184 is pivotally connected with the forward end of the lever 183, and is adapted to be swung in opposite directions for engagement with a pinion 185, rigidly secured to the end of the shaft 171. A spring 186 is provided to retain the pawl in either of its operative positions. It is thus seen that upon each revolution of the throw shaft 119, the pitman 182 and associated elements will turn the shaft 171 sufficiently, whereby the same through the medium of the operating screws 165 and associated elements, will advance the frame 163 upwardly, a distance corresponding to the pitch or distance between the pins carried by the shafts 176.

The operation of the apparatus is as follows: The sheet metal 61 is secured to the carriage 51, which may be assumed to be at the left in the starting position. The pawl 184 is in the lower operative position. The shaft 126 is rotated in the direction of the arrow and the shaft 89 is rotated in the direction of the arrow. Assuming that the punching mechanism is at rest, with lock-bolt 132 within the opening 131' between the clutch elements 127 and 128, the clutch 97 is active, whereby the carriage 51 is advanced to the right. When the pin 67 farthest to the right engages the cam 74 of the lever 73 and trips into a recess 69, such lever is depressed and released, whereby pawl 82 is elevated, disengages stop 84, and bell-crank lever 86 released, which automatically drops. This movement of the bell-crank lever will render clutch 97 inactive, and simultaneously withdraw lock-bolt 132 out of the opening 131' between clutch elements 127 and 128, whereby the clutch elements engage, the throw shaft 119 now rotating. The slide 120 descends, and the punch elements 144 will be active or inactive, depending upon whether there are pins 179 carried by the shafts 176, to engage the trip arm 162. The active punching elements now punch the openings in the sheet metal 61. By time the slide 120 reaches the end of its down stroke, cam 118 engages cam face 117 of the lever 115, whereby bell-crank lever 86 and associated elements are reset. The brake lever 101 which has been previously moved to the stop position is also returned to the upper released position. By the time the slide 120 moves upwardly one-half of its up stroke, the lock-bolt 132 enters the opening between the elements 127 and 128, whereby it automatically disengages these elements by the time the slide 120 reaches the uppermost position. The slide is thus stopped at its elevated position. The operation is repeated indefinitely, the carriage being advanced a step, stopped, the punching mechanism rendered active, and after performing its function returned to its upper position and stopped, and the carriage again advanced a step. During the movement of the carriage to the right, the frame 163 moves upwardly, whereby the lower pins 179 successively engage with the trip arms 162. By the time the lowermost pins 179 are reached by the trip arms 162, the plate has been completely punched, the carriage 159 now occupying the extreme position to the right with the frame 163 occupying its extreme upper position. The operation of the machine is now reversed; that is the carriage is fed to the left, which may be readily accomplished by reversing the direction of the rotation of the motor 95, the frame 163 being caused to descend by swinging the pawl 184 to the upper operative position. The only other change necessary to be made is to swing up the left presser-bar and swing down the right presser-bar, whereby the pins 67 can operate substantially as hereinbefore described. In this manner, the carriage is returned to the left and the frame 163 lowered, the pushing operation occurring, as hereinabove described.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In a machine of the character described, a movable carriage, means adapted when active to effect the travel of the carriage, means adapted to render the first named means inactive, a pin connected with the carriage and movable with relation thereto and adapted to be brought by the carriage into temporary engagement with said second named means to actuate the same, and means to hold and trip the pin.

2. In a machine of the character described, a movable carriage, means adapted when active to effect the travel of the carriage, means to render the first named means inactive including a pivoted lever arranged near the carriage, a plurality of longitudinally spaced pins connected with the carriage to travel therewith and adapted to move the lever, and means to hold and trip the pins.

3. In a machine of the character described, a movable carriage, means adapted when active to effect the travel of the carriage, means to render the first named means inactive including a pivoted lever adapted to swing automatically in one direction and provided with a lateral extension, an apertured plate connected with the carriage and extending longitudinally thereof, a plurality of spaced pins movably mounted within the apertures and adapted to engage with the extension of the pivoted lever, and a presser-bar arranged above the apertured plate and adapted to engage with the pins to hold and trip them.

4. In a machine of the character described, a movable carriage, means adapted when active to effect the travel of the carriage, gravity operated means adapted when released to render the first named means inactive, releasable lock means normally serving to prevent the movement of the gravity operated means in one direction, a plurality of pivoted levers adapted to automatically swing in one direction and provided with means to operate the lock means to release the same, an apertured plate connected with and extending longitudinally of the carriage, a plurality of pins movably mounted within the apertures of the plate and adapted to move the pivoted levers, and a presser-bar arranged upon one side of the apertured plate to engage with the pins.

5. In a machine of the character described, a movable carriage, means adapted when active to effect the travel of the carriage in either direction, automatically operating means adapted when released to render the first named means inactive, releasable lock means adapted to normally hold the automatically operating means against movement, a plurality of pivoted levers adapted to automatically swing in one direction and provided with means to operate the releasable lock means, an apertured plate connected with and extending longitudinally of the carriage and arranged near the pivoted levers, a plurality of pins movably mounted within the apertures of the plates and adapted to move the pivoted levers, and a plurality of presser-bars arranged upon one side of the apertured plate and adapted to be alternately moved into proximity thereto for engagement with the pins, depending upon the direction of travel of the carriage.

6. In a machine of the character described, a movable carriage, means adapted when active to effect the travel of the carriage, a gravity operated device for rendering the means inactive, means including a holding pawl pivotally connected with the gravity operated device to normally hold the same against movement, a plurality of pivoted levers adapted to automatically swing in one direction, a corresponding number of lifting pawls connected with the pivoted levers and adapted to elevate the holding pawl to release the same, an apertured plate connected with the carriage and extending longitudinally thereof, a plurality of pins movably mounted within the apertures in the plate and adapted to move the pivoted levers, and a presser-bar arranged above the plate in proximity thereto for engagement with the movable pins.

7. In a machine of the character described, a longitudinally movable carriage, an apparatus to effect a step by step movement of the carriage including a movable element, a plurality of pins connected with the carriage to travel therewith and movable with relation thereto, and means to temporarily hold each pin against movement in one direction when the same moves to a position in proximity to the movable element, substantially as described.

8. In a machine of the character described, a supporting structure, a movable carriage, means for effecting a step by step movement of the carriage and adapted to be automatically rendered inactive when the carriage has moved a predetermined distance, punching mechanism arranged above the carriage, and means automatically operated upon the movement of the punching mechanism to a certain position to render the first named means active.

9. In a machine of the character described, a supporting structure, a movable carriage, means adapted when active to effect the travel of the carriage, an automatically movable device adapted when released to render the same inactive, means actuated by the movement of the carriage to release the automatically movable device, and means to reset the automatically movable device.

10. In a machine of the character described, a supporting structure, a movable carriage, means adapted when active to effect the travel of the carriage, an automatically movable device adapted when released to render the means inactive, means actuated by the movement of the carriage to release the automatically movable device, punching mechanism arranged near the carriage, and means automatically operated upon the movement of the punching mechanism to a certain position to reset the automatically movable device.

11. In a machine of the character described, a movable slide, a punching element connected with the slide, a movable gag to render the punching element active and inactive, apparatus to move the gag and adapted to move with the slide, and a movable element adapted when in one position to hold the apparatus against movement with the slide.

12. In a machine of the character described, a movable slide, a punching element connected therewith, a movable gag to render the punching element active and inactive, apparatus connected with the movable gag to move the same and adapted to move with the slide, a movable stop to hold and release the apparatus, and means to move the stop.

13. In a machine of the character described, a slide, a punching element connected with the slide, a movable gag to render the punching element active and inactive, a pivoted lever secured to the slide to move the gag, a reciprocatory rod arranged near the slide and engaging therewith to move with the same, a link connecting the rod and pivoted lever, a stop movable into and out of engagement with the rod, and means to move the stop.

14. In a machine of the character described, punching mechanism including a plurality of punching elements, a corresponding number of movable gags to render the punching elements active and inactive, mechanisms for moving the gags, and a plurality of pin carrying rotatable elements arranged in proximity to the mechanisms to operate the same.

15. In a machine of the character described, punching mechanism including a plurality of punching elements, a corresponding number of movable gags to render the punching elements active and inactive, mechanisms for moving the gags, a plurality of rotatable elements having pins longitudinally spaced thereon to actuate the mechanisms, and means to simultaneously rotate the elements and move them longitudinally.

16. In a machine of the character described, punching mechanism including a plurality of punching elements, a corresponding number of movable gags to render the punching elements active and inactive, mechanisms for moving the gags, a reciprocatory frame, rotatable elements mounted within the frame and having pins connected therewith and longitudinally spaced with relation thereto for actuating the mechanisms, means to reciprocate the frame, and means to rotate the elements.

17. In a machine of the character described, punching mechanism including a plurality of punching elements, a corresponding number of movable gags to render the punching elements active and inactive, a reciprocatory frame, an operating element having screw-threads to engage with the reciprocatory frame and move the same in either direction, means to rotate the operating element, a gear splined upon the operating element and movable with the reciprocatory frame, a plurality of rotatable pin carrying shafts carried by the frame to operate the gags, and a train of gears connected with the rotatable shafts and driven by the first named gear.

18. In a machine of the character described, punching mechanism including a plurality of punching elements, a corresponding number of movable gags to render the punching elements active and inactive, mechanisms to move the gags, a frame, an operating element having screw-threads to engage with the frame to move the same in either direction, adjustable means to rotate the operating element in either direction, a gear splined upon the operating element and movable with the frame, a plurality of shafts carried by the frame and provided with spirally arranged longitudinally spaced pins to operate the mechanisms, and a train of gears connected with the shafts and driven by the first named gear.

19. In a machine of the character described, a supporting structure, a vertically movable frame carried by the supporting structure, vertical operating shafts having screw-threads engaging the frame to move the same, beveled gears connected with the lower ends of the vertical operating shafts, a horizontal driving shaft, beveled gears connected with the horizontal driving shaft and engaging the first named beveled gears, a pinion connected with the horizontal driving shaft, a swinging lever arranged near the pinion, a reversible double acting pawl pivoted to the lever and adapted to engage with the pinion to rotate the same in opposite directions, punching mechanism including a plurality of punching elements, a corresponding number of gags to render the punching elements active and inactive, and gag controlled mechanism mounted within the frame.

20. In a machine of the character described, a punching element, means to effect the longitudinal movement of the punching element, a movable gag to render the punching element active and inactive means including a rod provided with a lateral extension to engage with a portion of said means, a guide for the rod, a stop mounted upon the guide and movable into and out of engagement with the rod, a lever pivoted upon the guide and connected with the stop and provided with a lateral extension and a rotatable element carrying pins adapted to engage with the lateral extension of the pivoted lever.

21. In a machine of the character described, a supporting structure, a rotatable throw shaft journaled through the same, a slide engaging the supporting structure, driving connecting means between the slide and throw shaft, punching elements carried by the slide, a corresponding number of gags to render the punching elements active and inactive, gag control mechanism driven from the throw shaft, clutch mechanism to control the rotation of the throw shaft, a movable carriage arranged below the punching elements, apparatus to advance the carriage and automatically actuated upon the movement of the carriage for a predetermined distance to stop the carriage, a pivoted lever provided with means to operate the clutch mechanism, a second lever connected with the pivoted lever to turn therewith, a rod connecting the first named lever with a portion of the apparatus, a rod connecting the second named lever with another portion of the apparatus, a pivoted resetting lever connected with the second named rod, and a cam mounted upon the throw shaft to operate the resetting lever.

22. In a machine of the character described, a movable carriage, means adapted when active to effect the travel of the carriage, means to render the first named means inactive including a movable element arranged near the carriage, and a plurality of spaced pins connected with the carriage to travel therewith and adapted to be brought into engagement with the element to move the same.

23. In a machine of the character described, a movable carriage, means to effect a step by step movement of the carriage, and means for controlling the operation of the first named means embodying a plurality of spaced pins connected with the carriage to travel therewith.

24. In a machine of the character described, a movable carriage, a plurality of longitudinally spaced pins connected with the carriage, normally active means to advance the carriage, and means intermittently engaged and operated by the pins to render the first named means inactive.

25. In a machine of the character described, a movable carriage, a plurality of longitudinally spaced pins connected with the carriage to travel therewith, normally active means to advance the carriage, means intermittently engaged and operated by the pins to render the first named means inactive, and automatic means to render the first named means active after each time that the same has been rendered inactive.

26. In a machine of the character described, a movable carriage, normally active means to advance the carriage, means embodying a releasable latch to render the first named means inactive, and a plurality of devices operated by the movement of the carriage to actuate the latch to release it.

27. In a machine of the character described, a movable carriage, driving means therefor, stopping means controlling the operation of the driving means, and a plurality of spaced elements connected with the carriage to move therewith and adapted to be successively brought into engagement with the stopping means to intermittently operate the same whereby a step by step movement of the carriage is obtained.

In testimony whereof I affix my signature in presence of two witnesses.

JOHN WRIGHT.

Witnesses:
  LINDSAY McGILL,
  BENJAMIN FISCHER.